J. C. WEBSTER.
Potato-Digger.

No. 206,652. Patented July 30, 1878.

Witnesses:
Fred. G. Dieterich
August Petersohn

Inventor.
John C. Webster
by Louis Bagger & Co.
his Attorneys

N. PETERS, PHOTO-LITHOGRAPHER, WASHINGTON, D. C.

UNITED STATES PATENT OFFICE.

JOHN C. WEBSTER, OF WILTON, MAINE.

IMPROVEMENT IN POTATO-DIGGERS.

Specification forming part of Letters Patent No. 236,652, dated July 30, 1878; application filed April 16, 1878.

*To all whom it may concern:*

Be it known that I, JOHN CALHOUN WEBSTER, of Wilton, in the county of Franklin and State of Maine, have invented certain new and useful Improvements in Potato-Diggers; and I do hereby declare that the following is a full, clear, and exact description of the invention, which will enable others skilled in the art to which it appertains to make and use the same, reference being had to the accompanying drawings, which form a part of this specification, and in which—

Figure 1:
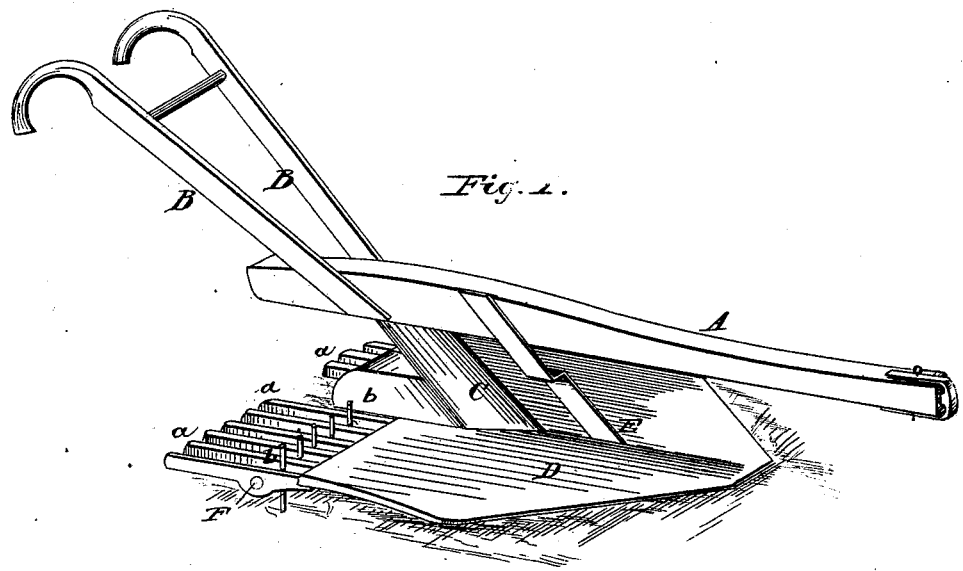
Figure 2:
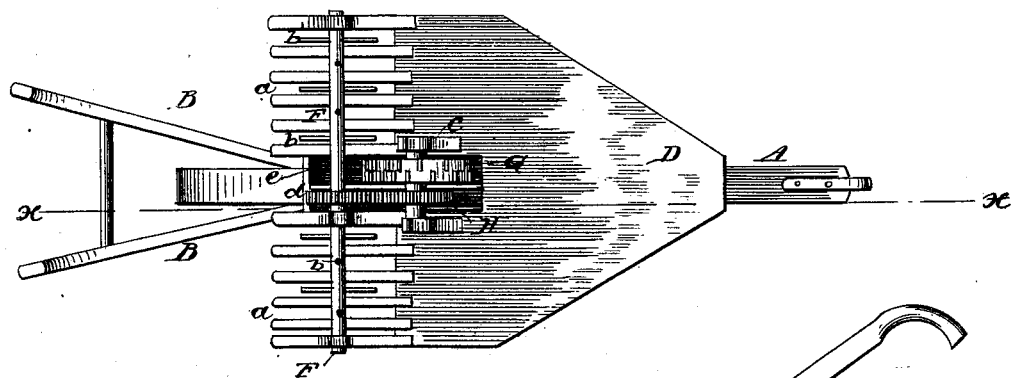
Figure 3:
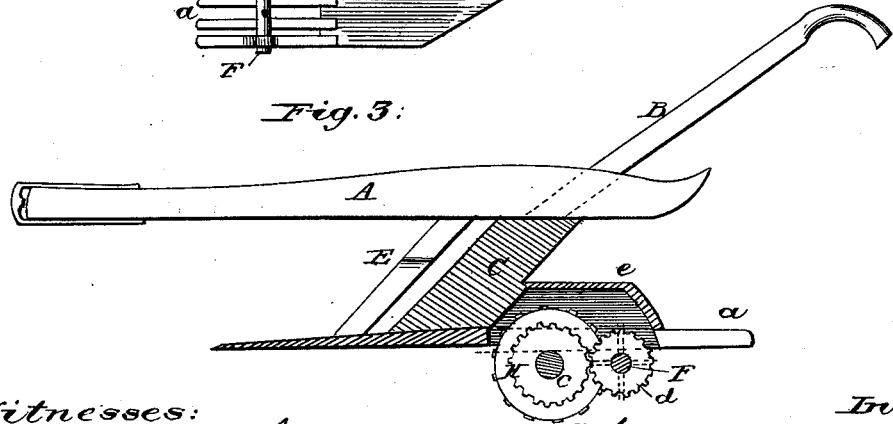

Figure 1 is a perspective view. Fig. 2 is a bottom plan, and Fig. 3 is a longitudinal vertical section on the line $x\ x$ in Fig. 2.

Similar letters of reference denote corresponding parts in all the figures.

This invention relates to certain improvements in potato-diggers, as I shall now proceed more fully to describe with reference to the drawings hereto annexed, in which—

A is the beam, and B B the handles. C is a triangular cutter-shaped standard, connecting the handle with the flat share D; and E is a colter or cutter arranged in front of the standard.

The share is a flat disk or plate, pointed at the front where it enters the soil, and having at its rear end a series of clearer bars or fingers, $a\ a$.

F is a shaft, having its bearings under the fingers $a\ a$ of the share, and provided with cross-pieces $b\ b$, which pass between the fingers $a\ a$ when the shaft rotates.

G is a drive-wheel secured upon a shaft, $c$, having its bearings under the share. Upon shaft $c$ is also secured a gear-wheel, H, engaging with a pinion, $d$, upon shaft F, which is thus rotated through the medium of the drive-wheel G.

A box, $e$, is formed upon the share, in rear of standard C, to accommodate the drive-wheel and gear-wheel H, and the latter, together with pinion $d$, may be protected from dirt on the under side by a suitable covering-plate. (Not shown in the drawing.)

In operation, the point of the share D enters the soil, which slides up its inclined plane, is divided by the colter E and standard C, and finally reaches the clearer-fingers $a\ a$. Here it is stirred by the cross-pieces $b\ b$ of the rotating shaft F, which causes the dirt to fall between the fingers $a\ a$, while the potatoes thus sifted are dropped behind the machine.

Having thus described my invention, I claim and desire to secure by Letters Patent of the United States—

In a potato-digger, the combination, with the beam A, of the plowshare or digger D, the cutter-shaped standard C, constructed with a hollow rearwardly-projecting extension or case, $b$, all formed in one piece, substantially as and for the purpose specified.

In testimony that I claim the foregoing as my own I have hereto affixed my signature in presence of two witnesses.

JOHN CALHOUN WEBSTER.

Witnesses:
JAMES BAILEY,
JAMES B. SEVERY.